& Mathis

United States Patent [19]
Adachi et al.

[11] Patent Number: 4,636,010
[45] Date of Patent: Jan. 13, 1987

[54] ANTISKID APPARATUS FOR VEHICLES

[75] Inventors: Yoshiharu Adachi, Gamagori; Takumi Nishimura, Chiryu; Tadao Saito, Nagoya; Hirochika Shibata, Kariya; Nobuyasu Nakanishi, Toyota; Akira Shirai, Toyoake; Noboru Noguchi, Toyota, all of Japan

[73] Assignees: Aisin Seiki Kabushiki Kaisha; Toyota Jidosha Kabushiki Kaisha, both of Aichi, Japan

[21] Appl. No.: 826,253

[22] Filed: Feb. 5, 1986

[30] Foreign Application Priority Data

Feb. 6, 1985 [JP] Japan .............................. 60-15427[U]
Mar. 5, 1985 [JP] Japan .................................. 60-43882
Jun. 6, 1985 [JP] Japan ................................ 60-123246

[51] Int. Cl.$^4$ ............................................... B60T 8/02
[52] U.S. Cl. .................... 303/115; 303/116; 303/119
[58] Field of Search ............... 303/115, 116, 119, 10, 303/13, 118, 117, 91, 92; 188/181

[56] References Cited

U.S. PATENT DOCUMENTS

| 3,722,960 | 3/1973 | Menar | 303/115 X |
| 4,229,049 | 10/1980 | Ando | 303/115 X |
| 4,515,412 | 5/1985 | Sato | 303/119 X |
| 4,526,426 | 7/1985 | Sato et al. | 303/115 X |

Primary Examiner—Douglas C. Butler
Attorney, Agent, or Firm—Burns, Doane, Swecker & Mathis

[57] ABSTRACT

An antiskid apparatus for an automotive vehicle having a master cylinder connected to wheel cylinders via respective brake lines, and a pressure regulating valve in a power hydraulic pressure line connecting an accumulator with a directional control valve, which is installed in a power hydraulic pressure line connecting the accumulator with a hydraulic pressure control piston. When the brake is applied, the pressure regulating valve is operable, in dependence upon master cylinder hydraulic pressure delivered by each wheel cylinder, to reduce power hydraulic pressure supplied by the accumulator to a hydraulic pressure higher, by a predetermined amount, than the master cylinder hydraulic pressure, and to deliver this reduced hydraulic pressure to each directional control valve. When the brake is not applied, the pressure regulating valve cuts off communication between the accumulator and each directional control valve and brings the hydraulic pressure in a hydraulic pressure line leading to a fluid chamber of the control piston to a value not higher than a set value through the directional control valve. Thus, the fluid chamber is supplied with hydraulic pressure reduced to a predetermined value to suppress a pressure change that occurs in the fluid chamber when the apparatus is operated, thereby reducing shock and noise and making it easier to control the operation of the apparatus.

25 Claims, 9 Drawing Figures

Brake master cylinder hydraulic pressure Pm

ANTISKID APPARATUS FOR VEHICLES

BACKGROUND OF THE INVENTION

This invention relates to an antiskid apparatus for vehicles adapted to prevent the wheels of an automotive vehicle from locking up and skidding on a road surface when the hydraulic pressure brake system of the vehicle is actuated.

A first aspect of the present invention relates to an antiskid system of an automotive vehicle, especially the actuator of the antiskid system. More particularly, the first aspect of the invention relates to a so-called "closed-type" actuator of a vehicle antiskid system equipped with a cut-off valve for selectively cutting each hydraulic pressure line connecting the vehicle brake master cylinder and a respective wheel brake cylinder into a hydraulic pressure line section on the brake master cylinder side and a hydraulic pressure line section on the wheel brake cylinder side; an accumulator for accumulating power hydraulic pressure above a maximum value of brake fluid pressure at which the vehicle wheels approach a state near lock-up; a piston moved in one direction by the hydraulic pressure in the hydraulic pressure line section on the wheel brake cylinder side and moved in the opposite direction by the power hydraulic pressure to close and open the respective cut-off valve and, moreover, to increase and restore the volume of the hydraulic pressure line section on the wheel brake cylinder side by such reciprocating motion; and a directional control valve installed in a power hydraulic pressure line connecting the accumulator with a fluid chamber formed on one side of the piston for being supplied with the power hydraulic pressure, the valve operating to discharge the power hydraulic pressure from the fluid chamber when the vehicle wheels approach the lock-up state and to supply the fluid chamber with the power hydraulic pressure under all other conditions.

In the above-described conventional closed-type actuator, no means whatsoever are interposed between the accumulator and the directional control valve. This means that though the power hydraulic pressure in the fluid chamber is discharged when the wheels approach the lock-up state due to actuation of the brake, the fluid chamber is supplied through the directional control valve with the high power hydraulic pressure in the accumulator under all other conditions regardless of whether the brake is being actuated or not.

A second aspect of the present invention relates to a vehicle antiskid apparatus equipped with a first valve installed in a hydraulic pressure line connecting the vehicle brake master cylinder and a respective vehicle wheel brake cylinder for selectively cutting-off the hydraulic pressure line into a hydraulic pressure line section on the brake master cylinder side and a hydraulic pressure line section on the wheel brake cylinder side; an (e.g., gas spring-type) accumulator for accumulating power hydraulic pressure generated by a power-driven pump; a hydraulic pressure control piston moved in one direction from a rest position by the hydraulic pressure in the hydraulic pressure line section on the wheel brake cylinder side and moved in the opposite direction to the rest position by the power hydraulic pressure to close and open the first valve and, moreover, to increase and restore the volume of the hydraulic pressure line section on the wheel brake cylinder side by such reciprocating motion; and a second valve operable when the wheels are rotating noramally for applying the power hydraulic pressure to the hydraulic pressure control piston in order to situate the hydraulic pressure control piston at the rest position by moving the piston against the hydraulic pressure of the hydraulic pressure line section on the wheel brake cylinder side, and operable when the wheels are about to lock for discharging the power hydraulic pressure from the hydraulic pressure control piston in order to move the hydraulic pressure control piston in the one direction by the hydraulic pressure of the hydraulic pressure circuit section on the wheel brake cylinder side.

An example of a prior-art apparatus of this type is described in the specification of U.S. Pat. No. 3,722,960. This conventional apparatus is adapted to apply the high power hydraulic pressure prevailing in the accumulator directly to the hydraulic pressure control piston when the wheel are rotating normally, and to discharge the power hydraulic pressure from the piston when the wheels are about to lock.

A third aspect of the present invention relates to an antiskid apparatus of the type which conventionally includes a plurality of cut-off valves for cutting a plurality of brake fluid pressure circuits, which connect the master cylinder and respective ones of the wheel brake cylinders, into a section on the master side and section on the wheel side; a single hydraulic pressure pump for feeding, under pressure, a working fluid contained in a reservoir; a single pressure regulating valve which, in dependence upon the master cylinder hydraulic pressure, controls the hydraulic pressure fed from the hydraulic pressure pump to obtain a power hydraulic pressure of a higher value; a plurality of hydraulic pressure control pistons which receive the power hydraulic pressure obtained by the pressure regulating valve on one side thereof and brake fluid pressure on the other side thereof for opening and closing respective ones of the cut-off valves on this other side and for controlling the hydraulic pressure on the wheel side in respective ones of the brake hydraulic pressure lines; and a plurality of directional control valves for effecting supply and discharge of power hydraulic pressure to and from respective ones of the hydraulic pressure control pistons in dependence upon whether or not the wheels of the vehicles are in a state near lock-up.

In the above-described apparatus, the cut-off valves, reservoir, hydraulic pressure pump, hydraulic pressure control pistons and directional control valves are assembled together and the resulting assembly is mounted on the vehicle. In the assembly before it is mounted, the pump is driven, a pressure equivalent to the master cylinder hydraulic pressure is applied to the pressure regulating valve and a pressure equivalent to the brake fluid pressure is applied to the other side of each hydraulic pressure control piston, under which condition the directional valves are actuated. When this is done, the hydraulic pressure control pistons travel their full stroke. By repeating this operation in a short time, therefore, a large quantity of working fluid can be made to flow from the hydraulic pressure pump toward the reservoir. This enables all of the air in the power hydraulic pressure system extending from the hydraulic pressure pump to the reservoir to be vented quickly and easily.

SUMMARY OF THE DISCLOSURE

A problem to be solved according to the first aspect of the present invention involves the occurrence of shock, noise and control difficulty in the conventional closed-type actuator. Specifically, since the hydraulic pressure supplied to the aforementioned fluid chamber of the control piston is the high power pressure that prevails in the accumulator, the pressure change in the fluid chamber is sudden and severe when the actuator operates to reduce and restore pressure. This sudden change in pressure internally of the fluid chamber not only produces shock and abnormal noise but makes it difficult to control actuation. Though the pressure change inside the fluid chamber can be suppressed by providing an orifice or the like in a fluid inflow or outflow passage of the chamber, in actual practice the amount of such suppression is inadequate. Further, in the conventional closed-type actuator, the arrangement is such the depressurizing and repressurizing action is achieved by supplying the fluid chamber with the high power hydraulic pressure of the accumulator as such and repeatedly discharging this pressure from the fluid chamber. At operation of the actuator, therefore, the high power hydraulic pressure in the accumulator is consumed in large quantity. This constitutes another problem with the prior art. Still another difficulty involves load applied to the control piston seal. Specifically, since the fluid chamber of the piston is supplied through the directional control valve with the high power hydraulic pressure from the accumulator even while the brake is not being applied, which is a period much longer than that of brake application, a seal member fitted on the piston is subjected to a large load ascribable to this high power hydraulic pressure.

A problem to be solved according to the second aspect of the present invention involves the load applied to certain vehicle seals. Specifically, when the vehicle is in use, the period of time during which the brake is applied is much shorter than that during which the brake is not applied. In fact, the period of non-application of the brake occupies the major part of total vehicle operating time. Accordingly, a large load is inflicted upon the seal member fitted on the hydraulic pressure control piston and upon a seal member used in forming the hydraulic pressure line that guides the power hydraulic pressure from the accumulator to the hydraulic pressure control piston. As a result, these seal members suffer a shortened lifetime and must be replaced frequently, thus demanding considerable labor for maintenance.

A method conceived to solve this problem is to install a third valve in the hydraulic pressure line that guides the working hydraulic pressure from the accumulator to the hydraulic pressure control piston. The third valve, which is responsive to pressing and release of the brake pedal, cuts off the fluid chamber, which applies the power hydraulic pressure to the hydraulic pressure control piston, from the accumulator and communicates the chamber with a drain circuit in response to release of the brake pedal. When the brake is not being applied, the third valve acts to release the power hydraulic pressure from the hydraulic pressure control piston. With such an arrangement, the load upon the seal members is significantly reduced to extend their life. However, when the brake pedal is released before the hydraulic pressure control piston is moved back to the rest position at operation of the apparatus, the power hydraulic pressure is discharged from the hydraulic pressure control piston by the third valve and, consequently, the piston is not returned to the rest position. This causes the brake master cylinder and the wheel brake cylinder to be left cut off. The next time the brake is applied, therefore, there is a delay in brake actuation as well as dragging or scoring of a seal cup fitted on the piston of the brake master cylinder.

To solve this last-mentioned problem, it has been contemplated to provide a spring for moving the hydraulic pressure control piston back to the rest position. Then, even if the brake pedal is released during the return of the piston to the rest position to cause a discharge of power hydraulic pressure from the pressure control piston due to the action of the third valve, the control piston will be moved back to the rest position by the spring while the fluid in the drain line is drawn into the power hydraulic pressure chamber through the third valve. It has also been contemplated to install a fourth valve, connected in parallel with the first valve, between the brake master cylinder and the wheel brake cylinder. The open and closing of the fourth valve is controlled by a piston actuated by the power hydraulic pressure applied to the hydraulic pressure control piston and is arranged to be opened in response to a discharge of power hydraulic pressure from the hydraulic pressure control piston. Even if the first valve is closed, hydraulic pressure will be supplied to the wheel brake cylinder from the brake master cylinder through the fourth valve. Problems still remain, however, in that repeated application and release of the brake pedal causes consumption of a large quantity of working fluid from the accumulator, which is accompanied by frequent pump operation. In other words, with the conventional apparatus of the above type, gas in the accumulator passes through a diaphragm and mixes with the working fluid. When power hydraulic pressure is discharged from the hydraulic pressure control piston by operation of the third valve in response to release of the brake pedal, the entrained gas in the hydraulic pressure line leading from the third valve to the power hydraulic pressure chamber expands. At the next application of the brake, the third valve responds to the depression of the brake pedal so that the aforementioned hydraulic pressure line is connected to the accumulator. At this time the entrained gas contracts and a comparatively large amount of working fluid corresponding to the volume of contraction is taken from the accumulator and consumed. The pump must be operated frequently to replenish this fluid. Moreover, as for the method which relies upon the fourth valve, provision of the valve may be deemed necessary in practice from the viewpoint of making it possible to supply hydraulic pressure from the brake master cylinder to the wheel brake cylinder in the event that power hydraulic pressure can no longer be obained owing to failure of the pump or accumulator. However, if, during the return stroke of the pressure control piston, power hydraulic pressure is discharged by operation of the third valve that accompanies release of the brake pedal, the piston comes to stop. When this occurs, the third valve again connects the hydraulic pressure line to the accumulator at the next application of the brake. As soon as this happens, the piston is turned to the rest position by the power hydraulic pressure, so that there is a decrease in the volume of the hydraulic pressure line between the brake master cylinder and the wheel brake cylinder.

The problem that results is that the is forced back, thus causing the driver to experience some discomfort.

A problem to be solved accoring to the third aspect of the present invention involves the venting of the air from the power hydraulic pressure system. Specifically, there are cases where the above-described assembly of the antiskid apparatus comprising the cut-off valves, reservoir, hydraulic pressure pump, hydraulic pressure control pistons and directional control valves cannot be installed as such in the vehicle (usually the vehicle engine room) because of space considerations. This means that these components must be installed in disassembled form. When such is the case, the air in the power hydraulic pressure system must be vented after the components of the apparatus are installed. To accomplish venting of the air after installation, it is necessary that the pressurized fluid be made to flow from the hydraulic pressure pump of the apparatus to the reservoir by repeatedly setting up a state in which the apparatus can be operated while the vehicle itself is at rest. However, the very act of repeatedly setting up the abovementioned state while the vehicle is at rest obviously involves difficulty. Moreover, the stroke of the hydraulic pressure control pistons obtained by a single actuation of the apparatus is so small as to cause only little flow of fluid from the hydraulic pressure pump to the reservoir. The air venting operation therefore requires an extended period of time.

An object of the first aspect of the present invention is to solve the aforementioned problems encountered in the prior art set forth above.

According to the first aspect of the present invention, the foregoing object is attained by providing a pressure regulating valve in the power hydraulic pressure line connecting the accumulator with the above-described actuator. When the brake is applied, the pressure regulating valve is operable, in dependence upon the master cylinder hydraulic pressure applied by the brake master cylinder, to reduce the power hydraulic pressure supplied by the accumulator to a hydraulic pressure higher, by a predetermined amount, than the master cylinder hydraulic pressure, and to deliver this reduced hydraulic pressure to the directional control valve. When the brake is not applied, the pressure regulating valve cuts off the communication between the accumulator and the directional control valve and brings the hydraulic pressure in the hydraulic pressure line leading to the fluid chamber to a value not higher than a set value, i.e., a comparatively low value, through the directional control valve.

As to the function and effect of the first aspect of the present invention, the pressure regulating valve is operable at application of the brake to reduce the high power hydraulic pressure in the accumulator to a predetermined value in dependence upon the master cylinder hydraulic pressure and to supply this reduced pressure to the directional control valve. In consequence, the aforementioned fluid chamber is supplied with hydraulic pressure reduced to a predetermined value to suppress the pressure change that occurs in the fluid chamber when the actuator is operated. This in turn suppresses shock and noise and makes it easier to control the operation of the actuator. Further, according to the first aspect of the present invention, the high power hydraulic pressure in the accumulator is reduced by the pressure regulating valve and the reduced pressure acts upon the fluid chamber. Operation of the actuator is obtained by exclusion of this pressure. As a result, the hydraulic pressure stored in the accumulator is consumed in an amount less than that in the prior art arrangement. Moreover, when the brake is not applied, during which time it is unnecessary to place the actuator in an operable state, the pressure regulating valve cuts off the connection between the accumulator and the directional control valve and brings the hydraulic pressure in the hydraulic pressure line leading to the fluid chamber to a value not higher than a comparatively low set value through the directional control valve. This greatly alleviates the hydraulic pressure-induced load acting upon the seal member fitted on the piston, thereby significantly improving the durability of the seal member.

An object of the second aspect of the present invention is to solve the aforementioned problems encountered in the prior art set forth above.

According to the second aspect of the present invention, the foregoing object is attained by providing an antiskid apparatus provided with a third valve (like the pressure regulating valve of the first aspect) having a first valve portion for controlling communication and cut-off of communication between the accumulator and the power hydraulic pressure chamber supplying the hydraulic pressure control piston with power hydraulic pressure; a second valve portion for controlling communication and cut-off of communication between the power hydraulic pressure chamber and the drain circuit; a piston actuated by hydraulic pressure produced by the brake master cylinder for opening and closing the first and second valve portions in such a manner that power hydraulic pressure proportional to the hydraulic pressure produced by the brake master cylinder is applied to the power hydraulic pressure chamber from the accumulator; and spring means for opening and closing the first and second valve portions in such a manner that a predetermined minimum power hydraulic pressure is applied to the power hydraulic pressure chamber from the accumulator when the piston is in the non-actuated state.

As to the function and effect of the second aspect of the present invention, the hydraulic pressure control piston is provided by the operation of the third valve with a predetermined minimum power hydraulic pressure from the accumulator when the brake pedal is released. The minimum power hydraulic pressure is set to a value capable of realizing a satisfactory reduction in the load acting upon seal members such as the seal member fitted on the pressure control piston as well as a satisfactory reduction in the expansion of the gas mixed with the working fluid. Accordingly, in comparison with the conventional case where the high power hydraulic pressure in the accumulator acts directly upon the pressure control piston, seal lifetime is much longer and, hence, less labor is required for maintenance. Further, in comparison with the case where the power hydraulic pressure chamber is depressurized to atmospheric pressure when the brake pedal is released, there is much less expansion of the gas at release of the brake pedal and much less consumption of working fluid from the accumulator due to actuation of the third valve accompanying repeated pressing and release of the brake pedal. This means fewer pump operating cycles and less power loss. Moreover, even if the brake pedal is released before the pressure control piston is moved back to the rest position at actuation of the apparatus, the pressure control piston is provided with the minimum power hydraulic pressure from the accumulator owing to actuation of the third valve, as a result of which the pressure control piston is moved back to the rest position. This solves the aforementioned problems ascribable to stopping of the pressure control piston in the course of its return to the rest position, namely the problems of delayed brake actuation, scoring of the seal at the master cylinder and the forcing back of the brake pedal.

An object of the third aspect of the present invention is to solve the aforementioned problems encountered in the prior art set forth above.

According to the third aspect of the present invention, the foregoing object is attained by providing an antiskid apparatus for an automotive vehicle comprising: a plurality of cut-off valves, which are assembled into a body to be mounted on the vehicle body, for cutting a plurality of brake fluid pressure lines, which connect the master cylinder and respective ones of the wheel cylinders of the vehicle, into a section on the master side and a section on the wheel side; a single hydraulic pressure pump, which is assembled in the body or on the vehicle, for feeding, under pressure, a working fluid contained in a reservoir; a single pressure regulating valve assembled in the body and which, in dependence upon the master cylinder hydraulic pressure from the master cylinder, controls the pressurized fluid fed from the hydraulic pressure pump to obtain a power hydraulic pressure higher than the master cylinder hydraulic pressure and to feed this power hydraulic pressure into a supply line, the pressure regulating valve communicating the supply line with the reservoir through a discharge line when the master cylinder hydraulic pressure is approximately zero, the pressure regulating valve having an internally provided check valve for cutting off flow from the hydraulic pressure pump to the supply line; a plurality of hydraulic pressure control pistons which are assembled in the body and which each form on one side thereof a power hydraulic pressure chamber receiving the power hydraulic pressure and on the other side thereof a brake fluid pressure chamber communicating with respective ones of the brake fluid pressure lines for being moved in one direction by hydraulic pressure on the wheel-side section of the respective brake hydraulic pressure line and moved back in the other direction by the power hydraulic pressure to close and open the respective cut-off valves and increase and restore the volume on the wheel-side section by this movement in the one direction and movement in the other direction; and a plurality of directional control valves assembled in the body and installed in the supply line connecting the power hydraulic pressure chambers with the pressure regulating valve and in the discharge line connecting the hydraulic pressure chambers with the reservoir for communicating the respective power hydraulic pressure chambers with the reservoir when the respective wheels, which are controlled by the respective brake fluid pressures applied through the respective brake fluid pressure lines, attain a state near lock-up, and for communicating the respective power hydraulic pressure chambers with the pressure regulating valve under all other conditions. In the pressure regulating valve, a portion of the check valve on the side of the hydraulic pressure pump is equipped with a single air bleed, and the discharge line in the body is provided with a second check valve which allows flow to the reservoir.

The function and effect of the third aspect of the present invention will now be described. The reservoir and hydraulic pressure pump may be mounted on the vehicle separately of the cut-off valves, pressure regulating valve, hydraulic pressure control pistons and directional control valves which are assembled in the body. In the assembly before it is installed in the body, which assembly comprises the cut-off valves, pressure regulating valve, hydraulic pressure control pistons and directional control valves, the pressure regulating valve is supplied with pressurized fluid from a pressurized fluid supply unit and is subjected to a pressure equivalent to the master cylinder hydraulic pressure. Moreover, a pressure equivalent to the brake hydraulic pressure is applied to the other side of each hydraulic pressure control piston, under which condition the selector valves are actuated. When this is done, the hydraulic pressure control pistons travel their full stroke. By repeating this operation in a short time, therefore, a large quantity of working fluid can be made to flow from the pressurized fluid supply unit toward the discharge line. This enables all of the air in the power hydraulic pressure system extending from the pressure regulating valve of the assembly to the discharge line in the body to be vented quickly and easily. The vented state can be maintained in the assembly proper by the check valve in the pressure regulating valve and the second check valve provided in the discharge line of the body.

Accordingly, after the apparatus (namely the aforesaid assembly, the reservoir and the hydraulic pressure pump) is installed in the vehicle, all of the air in the power hydraulic pressure system of the apparatus can be vented if the hydraulic pressure pump is driven a short time in a state where the single air bleed provided in the pressure regulating valve is open to cause the pressurized fluid to flow into the line extending from the hydraulic pressure pump to the check valve in the pressure regulating valve to vent the air from the line. Though the air in the line extending from the second check valve in the discharge line of the body to the reservoir cannot be vented by the above-described operation, the air is discharged into the reservoir automatically when the apparatus is operated.

Thus, in the antiskid apparatus of the present invention, the air is vented from the power hydraulic pressure system with much improved operability in a case where the reservoir and hydraulic pressure pump are mounted on the vehicle separately of the cut-off valves, pressure regulating valve, hydraulic pressure control pistons and directional control valves which are assembled in the body.

DETAILED DESCRIPTION OF THE PREFERRED EMBODIMENTS

An embodiment of the first and third aspects of the present invention will now be described with reference to the drawings.

Figure 1A:
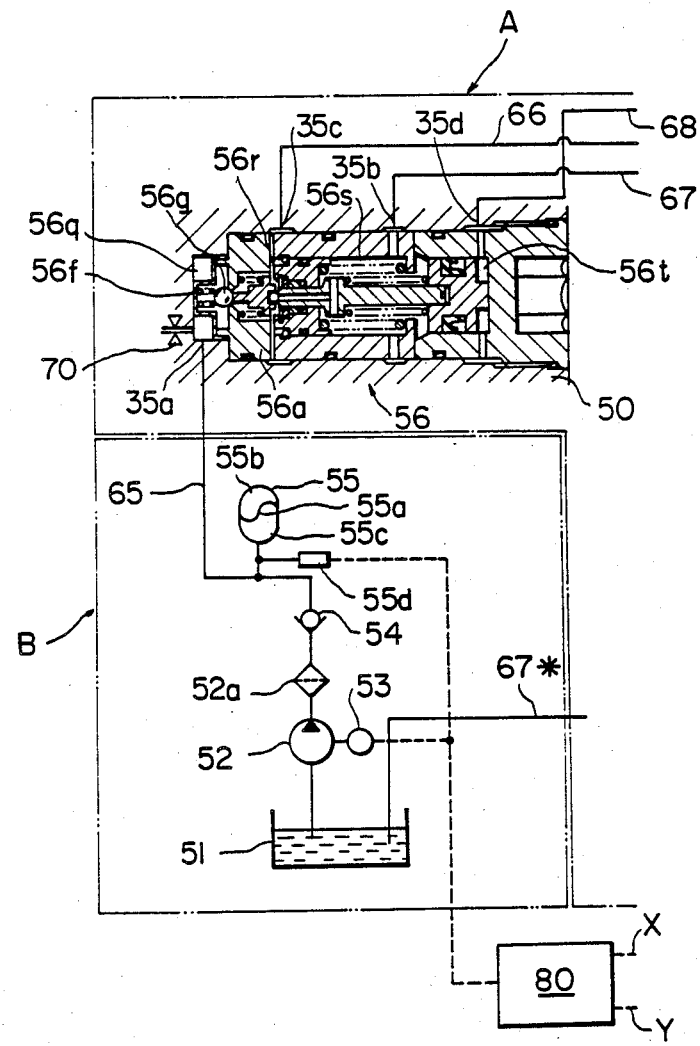
FIGS. 1A, 1B are a view schematically showing an embodiment of an antiskid apparatus for vehicles in its entirety.
Figure 1B:
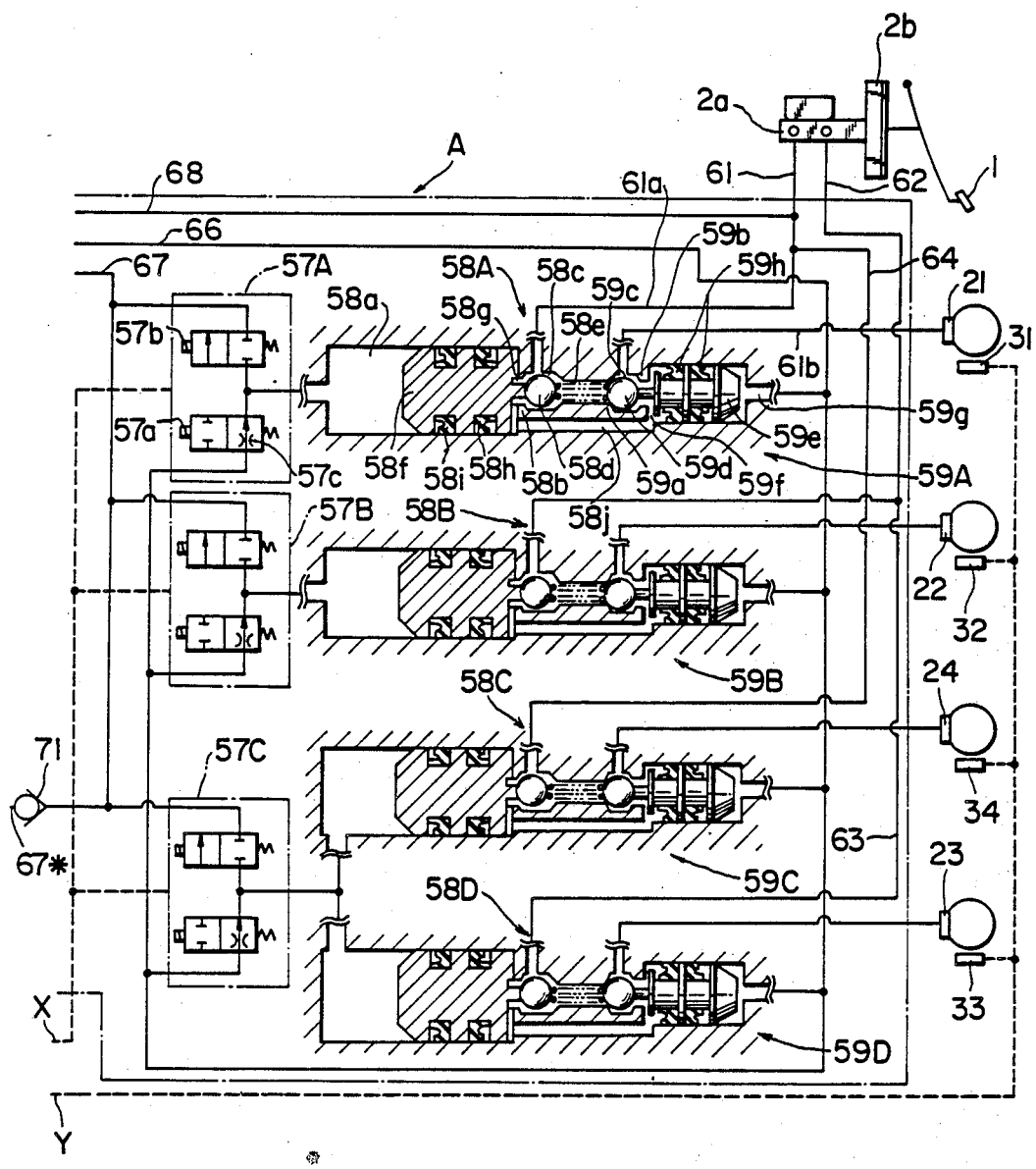

FIGS. 1A, 1B illustrate a first embodiment of an antiskid apparatus in accordance with the present invention. The antiskid apparatus is applied to a vehicle having a tandem brake master cylinder (hereafter referred to simply as a master cylinder) 2a actuated by a brake pedal 1 of the vehicle acting through a brake booster 2b. The master cylinder 2a has a forward fluid chamber connected to a left front wheel brake cylinder (hereafter referred to simply as a wheel cylinder) 21 through a brake fluid pressure line 61. The line 61 branches into a brake fluid pressure line 64 through which the forward fluid chamber is connected to a right rear wheel cylinder 24. The master cylinder 2a also has rearward fluid chamber connected to a right front wheel brake cylinder 22 through a brake fluid pressure line 62. The line 62 branches into a brake fluid pressure line 63 through which the rearward fluid chamber is connected to a left rear wheel cylinder 23. The antiskid apparatus applied to the vehicle of the type is adapted to independently control the brake fluid pressures of the respective wheel cylinders 21, 22, 23 and 24. A proportioning valve of known construction, not shown, is interposed between the brake fluid pressure lines 63 and 64.

The antiskid apparatus is equipped with a sensor 31 for sensing the rpm of the left front wheel, a sensor 32 for sensing the rpm of the right front wheel, a sensor 33 for sensing the rpm of the left rear wheel, a sensor 34 for sensing the rpm of the right rear wheel, a computerized electronic control circuit 80 and an actuator A. The actuator A includes a reservoir 51, a hydraulic pressure pump 52, an electric motor 53, a check valve 54, an accumulator 55, a pressure regulating valve 56, solenoid valves 57A, 57B, 57C, cut-off valve piston portions 58A, 58B, 58C, 58D, and by-pass valves 59A, 59B, 59C, 59D. The reservoir 51 pools brake fluid, which is the same as that in the brake fluid pressure lines leading from the master cylinder 2a to each of the wheel cylinders 21 through 24, as a power hydraulic pressure medium.

The hydraulic pressure pump 52 is driven by the motor 53 to feed the power hydraulic pressure medium in the reservoir 51 to the accumulator 55 through a filter 52a and the check valve 54. The pump 52, together with the reservoir 51 and accumulator 55, is mounted via its housing on a body 50 constituting a structural portion of the actuator A. The body 50 corresponds to the portion enclosed by the one-dot chain line in FIG. 1A and is itself mounted on the vehicle body, which is not shown.

The accumulator 55 is divided into a gas chamber 55b and an accumulator chamber 55c and is provided with a pressure switch 55d. When power hydraulic pressure in the accumulator 55 is lower than a set value, the pressure switch 55d opens and a signal indicative of this condition is sent to the electronic control circuit 80, which responds by turning on the drive circuit of the motor 53. When the power hydraulic pressure in the accumulator 55 reaches the set value owing to operation of the hydraulic pressure pump 52, the pressure switch 55d closes. Upon closure of the switch 55d, the electronic control circuit 80 rotates the motor 53 for a set period of time and then deactivates the motor drive circuit. As a result, the accumulator 55 accumulates a predetermined power hydraulic pressure over a range extending from the set value to a value elevated a substantially fixed amount by operation of the hydraulic pressure pump 52 the set period of time. The set value is selected to be the maximum brake fluid pressure at which a wheel will attain a state near lock-up when the brake is applied. This maximum brake fluid pressure shall be referred to as the brake fluid pressure at which a wheel will attain the state near lock-up where the road surface is at its least slippery condition.

The pressure regulating valve 56 is installed in the power hydraulic pressure line connecting the accumulator 55 with the solenoid valves 57A–57C and by-pass valves 59A–59D. As shown in detail in FIGS. 1A and 2, the pressure regulating valve 56 comprises a valve seat member 56a, a stopper 56b, a holder 56c and a plug 56d, these being assembled in a cylinder 50a provided in the body 50 of the actuator A. The pressure regulating valve further comprises a retainer 56e, a spring 56f and a ball-shaped valve element 56g assembled at the left end of the valve seat member 56a. The pressure regulating valve 56 further comprises a valve body (movable member) 56i installed in the valve seat member 56a for movement in the axial direction and urged rightward by a spring 56h, the valve body 56i being in abutting contact with the ball-shaped valve element 56g and the stopper 56b; a first piston 56l installed for axial sliding movement in a bore provided in the holder 56c and urged leftward by a spring 56j, the leftward motion of this first piston being limited by a clip 56k; a second piston 56m installed for axial sliding movement in a bore provided in the plug 56d; and a spool (rod) 56p installed for axial sliding motion along the central axis of the two pistons 56l, 56m and urged leftward by a spring 56n into abutting contact with a ball valve portion of the valve body 56i to close the passage. Formed in the pressure regulating valve 56 on the left side of the valve seat member 56a is a fluid chamber 56q communicating at all times with the accumulator 55 through a hydraulic pressure line 65. Also formed in the pressure regulating valve 56 between the valve seat member 56a and the holder 56c is a fluid chamber 56r communicating at all times with the solenoid valves 57A–57C and by-pass valves 59A–59D through a supply line 66 and capable of being brought into communication with the fluid chamber 56q. Fluid chambers 56s, 56t are also formed in the pressure regulating valve. The fluid chamber 56s is defined by the holder 56c, plug 56d and pistons 56l, 56m, communicates at all times with the reservoir 51 through a discharge line 67 and is capable of being brought into communication with the fluid chamber 56r. The fluid chamber 56t is formed between the plug 56d and second piston 56m and is in constant communication with the forward chamber of the master cylinder 2a through a hydraulic pressure line 68 branching from the brake fluid pressure line 61.

Figure 2:
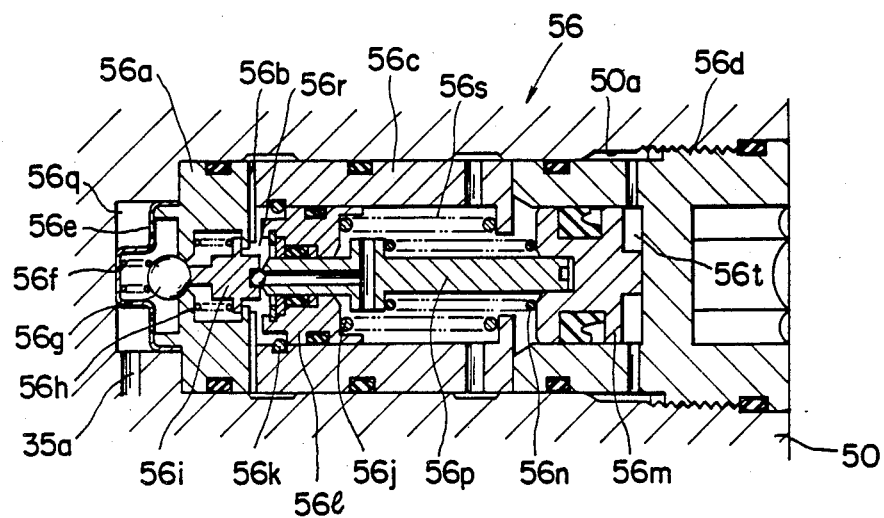
FIG. 2 is an enlarged sectional view showing a pressure regulating valve included in the apparatus of FIG. 1.
Figure 3:
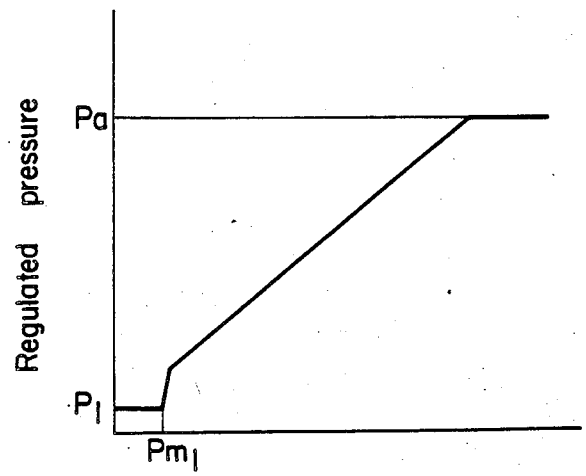
FIG. 3 shows a characteristic curve of the pressure regulating valve in FIGS. 1 and 2.

The pressure regulating valve 56 is in the state illustrated in FIGS. 1A and 2 when the hydraulic pressure in the forward fluid chamber of the master cylinder 2a, namely when master cylinder hydraulic pressure Pm is zero, which is the state that prevails when the brake is not being applied. Thus, the ball-shaped valve element 56g is seated on the valve seat of the valve seat member 56a to cut off communication between the fluid chambers 56q, 56r, and the ball valve portion of the valve body 56i is seated on a valve seat provided on the left end of the spool 56p to cut off communication between the fluid chambers 56r, 56s. Under these conditions, a hydraulic pressure Pl corresponding to the spring force of the spring 56n urging the spool 56p remains in the fluid chamber 56r. When the braake is applied to send the master cylinder hydraulic pressure Pm above a set value Pml, the ball-shaped valve element 56g, valve body 56i, both pistons 56l, 56m and the spool 56p cooperate in such a manner that the pressure regulating valve 56 regulates the hydraulic pressure (supply pressure) prevailing in the fluid chamber 56r and supplied to the solenoid valves 57A–57C and by-pass valves 59A–59D. The pressure is regulated in the manner shown in FIG. 3. The regulation of the supply pressure is performed in dependence upon the master cylinder hydraulic pressure Pm by reducing the power hydraulic pressure Pa, which is supplied by the accumulator 55, down to a hydraulic pressure a predetermined amount higher than the master cylinder hydraulic pressure Pm.

The solenoid valves 57A, 57B, 57C, which are identical in structure, are controlled by the computerized electronic control circuit 40 and serve to independently supply and exhaust the power hydraulic pressure fed to the cut-off valves piston portions 58a, 58B, 58C, 58D. Let us describe the construction of these solenoid valves by taking the solenoid valve 57A as an example.

The solenoid valve 57A includes an in-flow control valve 57a and an out-flow control valve 57b, both of which are adapted so as to be energized simultaneously. When de-energized, the in-flow control valve 57a occupies the illustrated position under the force of a spring to communicate the fluid chamber 56r of pressure regulating valve 56 with the power hydraulic pressure chamber 58a of cut-off valve piston port 58A via the supply line 66 and an orifice 57c. When energized, the in-flow control valve 57a switches over against the force of the spring to cut off the communication between the two fluid chambers 56r, 58a. When de-energized, the out-flow control valve 57b occupies the illustrated position under the force of a spring to cut off communication between the power hydraulic pressure chamber 58a and the reservoir 51. When energized, the out-flow control valve 57b switches over against the force of the spring to communicate the fluid chamber 58a with the reservoir 51 through the discharge line 67.

The cut-off valve piston portions 58A–58D are of identical structure, which will now be described taking the cut-off valve piston portion 58A as an example.

The cut-off valve piston portion 58A is equipped with a cut-off valve comprising a valve seat 58b, a valve chamber 58c, a ball-shaped valve element 58d, and a spring 58e; a control piston 58f; a power hydraulic pressure chamber 58a formed on one side of the control piston 58f; a brake fluid pressure chamber 58g formed on the other side of the control piston 58f; a ring-shaped cup seal 58h for brake fluid pressure fitted on the control piston 58f; and a ring-shaped cup seal 58i for power hydraulic pressure fitted on the control piston 58f. When the power hydraulic pressure chamber 58a in the cut-off valve piston portion 58A is being supplied with a predetermined power hydraulic pressure through the control valve 56 and solenoid valve 57A, the control piston 58f unseats the valve element 58d from the seat portion of the valve seat 58b so that a hydraulic pressure line 61a of the brake fluid pressure line 61 on the side of the master cylinder 2a and a hydraulic pressure line 61a of the brake fluid pressure line 61 on the side of the wheel cylinder 21 are communicated with each other through the valve chamber 58c, brake fluid pressure chamber 58g, a cut-out provided in the control piston 58f, a passageway 58j, and a fluid chamber 59f and valve chamber 59c, which are described below, of the by-pass valve 59A. In addition, the control piston 58f is in abutting contact with the back surface of the valve seat 58b to minimize the volume of the brake fluid chamber 58g, namely the volume of a space communicating with the hydraulic pressure line 61b on the wheel cylinder side. In a case where the solenoid valve 57A is actuated to cut off communication between the power hydraulic pressure chamber 58a and the pressure regulating valve 56 and communicate the chamber 58a with the reservoir 51 to exhaust the power hydraulic pressure, the control piston 58f is moved leftward by the brake fluid pressure to seat the valve element 58d on the seat portion of the valve seat 58d. As a result, the valve chamber 58c and the brake fluid pressure chamber 58g are taken out of communication os that the brake fluid pressure line 61 is cut into the hydraulic pressure line 61b on the wheel cylinder side and the hydraulic pressure line 61a on the master cylinder side, and so that the volume of the hydraulic pressure line 61b on the wheel cylinder side increases to reduce the brake fluid pressure acting upon the wheel cylinder 21.

The by-pass valves 59A–59D are of the same structure, which will now be described taking the by-pass valve 59A as an example.

The by-pass valve 59A is for dealing with a situation where supply of the brake fluid pressure to the wheel cylinder 21 is rendered impossible. More specifically, a situation is conceivable where the required power hydraulic pressure may not be applied to the power hydraulic pressure chamber 58a even when the brake pedal 1 is depressed. For example, this may occur when the hydraulic pressure pump 52 or motor 53 fails and the power hydraulic pressure line is damaged. If such is the case, the cut-off valve piston portion 58A would cut off the hydraulic pressure line 61a on the master cylinder side from the hydraulic pressure line 61b on the wheel cylinder side, thereby making it impossible for the brake fluid pressure from the master cylinder 2a to be supplied to the wheel cylinder 21 through the cut-off valve piston portion 58A. The by-pass valve 59A, which is designed to deal with such an occurrence, includes valve seats 59a, 59b, a valve chamber 59c, a ball-shaped valve element 59d, the aforementioned spring 58e (which is shared by the valve element 58d), a working piston 59e fluid chambers 59f, 59g, and a seal ring 59h. When the predetermined power hydraulic pressure is being supplied to the fluid chamber 59g of by-pass valve 59A, the piston 59e seats the valve element 59d on the seat portion of the valve seat 59a to close a bore in the valve seat 59a, namely a by-pass passageway accommodating the spring 58e, and also brings the valve chamber 59c into communication with the brake fluid chamber 58g of the cut-off valve piston portion 58A through the fluid chamber 59f and passageway 58j. When the power hydraulic pressure supplied to the fluid chamber 59g drops below the predetermined value, the working piston 59e is moved rightward by the spring 58e or by the spring and the brake fluid pressure acting upon the valve element 59d or the working piston 59e. Owing to the rightward movement of piston 59e, the valve element 59d separates from the seat portion of the valve seat 59a to allow an inflow of brake fluid from the valve chamber 58c of the cut-off valve piston portion 58A to the valve chamber 59c through the bore in the valve seat 59a. When the valve element 59d is eventually seated on the seal portion of the valve seat 59b, reverse flow of brake fluid from the valve chamber 59c to the fluid chamber 59f is stopped. In this case, namely when the power hydraulic pressure supplied to the fluid chamber 59g drops below the predetermined value, the hydraulic pressure in the power hydraulic pressure chamber 58a of the cut-off valve piston portion 58A also drops, so that the control piston 58f is moved one way by the brake fluid pressure to seat the valve element 58d on the seat portion of the valve seat 58b. In consequence, the two chambers 58g, 59f are sealed off to stop the outflow of fluid to these chambers, thereby assuring a braking action.

The computer 80 analyzes the signals from the sensors 31, 32, 33, 34 to sense the rotating state of the left front wheel, right front wheel, left rear wheel and right rear wheel. For instance, when the left front wheel attains a state near lock-up, the solenoid valve 57A (namely the in-flow and out-flow control valves 57a, 57b) is energized to discharge the power hydraulic pressure supplied to the cut-off valve piston portion 58A to the reservoir 51. When the rotation of the left front wheel recovers sufficiently owing to a continuous decrease in the brake fluid pressure of the hydraulic pressure line 61b on the wheel cylinder side ascribable to the depressurization of the cut-off valve piston portion 58A, the solenoid valve 57A is de-energized to again supply the power hydraulic pressure to the cut-off valve piston portion 58A, and the brake fluid pressure of the hydraulic pressure line 61b on the wheel cylinder side is raised again by the operation of the cut-off valve piston portion 58A. In this process for re-elevating the brake fluid pressure, the computer 80 alternately energizes and de-energizes the solenoid valve 57A repeatedly to thereby control the rate at which the brake fluid pressure rises, thus preventing the front left wheel from re-attaining the state near lock-up.

Let us now describe the advantages of the first aspect of the present invention.

In the above-described embodiment of the first aspect of the invention, the pressure regulating valve 56 having the pressure regulating function and the residual pressure retaining function is installed in the power hydraulic pressure line connecting the accumulator 55 with the solenoid valves 57A-57C and by-pass valves 59A-59D. Therefore, when the brake is applied, the pressure regulating valve 56 reduces the power hydraulic pressure Pa in accumulator 55 to a predetermined value in dependence upon the master cylinder hydraulic pressure Pm and supplies this reduced pressure to each of the solenoid valves 57A-57C and each of the by-pass valves 59A-59D. Consequently, the fluid chamber 58a in each of the cut-off valve piston portions 58A-58D is supplied with the hydraulic pressure reduced to the predetermined value to mitigate the pressure change that takes place in each fluid chamber when the actuator A operates and, hence, to suppress the occurrence of shock and abnormal noise and facilitate the control of actuator operation. Further, the high power hydraulic pressure Pa in the accumulator 55 is reduced by the pressure regulating valve 56 and the reduced pressure is supplied to each fluid chamber 58a. Operation of the actuator A is obtained by exclusion of this reduced pressure. As a result, the hydraulic pressure Pa stored in the accumulator 55 is consumed in an amount less than that in the prior art arrangement. Moreover, when the brake is not applied, during which time it is unnecessary to place the actuator in an operable state, the pressure regulating valve 56 cuts off communication between the accumulator 55 and each of the solenoid valves 57A-57C and by-pass valves 59A-59D and exhausts, to a very low residual pressure P1, the hydraulic pressure in the hydraulic pressure line leading to the fluid chamber 58a in each of the cut-off valve piston portions 58A-58D. This greatly alleviates the hydraulic pressure-induced load acting upon all of the seal members used in the hydraulic pressure lines extending from the pressure regulating valve 56 to the fluid chambers 58a of the respective cut-off valve piston portions 58A-58D, and not just the cup seals 58h, 58i fitted on the piston 58f of each of the cut-off valve piston portions 58A-58D and the seal ring 59h fitted on the piston 59e of each of the by-pass valves 59A-59D. The end result is extended seal lifetime.

In the above embodiment, the predetermined residual pressure P1 is maintained in the power hydraulic pressure lines to the fluid chambers 58a of the respective cut-off valve piston portions 58A-58D by the pressure regulating valve 56 when the brake is not being applied. Therefore, the piston 58f of each of the cut-off valve piston portions 58A-58D and the piston 59e of each of the by-pass valves 59A-59D are situated at the illustrated positions and are not moved unnecessarily. Furthermore, when the brake is not applied, the pressure regulating valve 56 cuts off the communication between the accumulator 55 and the solenoid valves 57A-57C are by-pass valves 59A-59D. Consequently, gas in the accumulator 55 which has passed through the accumulator diaphragm 55a and penetrated the power hydraulic pressure line will not flow into the brake fluid pressure line.

Let us now describe a variant of the first aspect of the present invention.

In the above embodiment, the pressure regulating valve 56 having the pressure regulating function and residual pressure maintaining function is employed as the pressure regulating valve installed in the power hydraulic pressure line connecting the accumulator 55 with the solenoid valves 57A-57C and by-pass valves 59A-59D. However, it is also possible to adopt a pressure regulating valve which functions when the brake is applied to reduce, down to a hydraulic pressure higher by a predetermined amount than the master cylinder hydraulic pressure Pm obtained from the brake master cylinder 2a, the power hydraulic pressure supplied by the accumulator 55, this being performed in dependence upon the master cylinder hydraulic pressure Pm, and to supply this reduced pressure to each of the solenoid valves 57A-57C, and which functions when the brake is not being applied to cut off communication between the accumulator 55 and each of the solenoid valves 57A-57C and to reduce, to a value below a set value, the hydraulic pressure in the power hydraulic pressure line leading to the fluid chamber 58a in each of the cut-off valve piston portions 58A-58D.

Let us now describe the advantages of the third aspect of the present invention.

In the above-described third aspect of the present invention, there is provided a single air bleed 70 corresponding to the fluid chamber 56q of the pressure regulating valve 56 (in other words, at the portion on the hydraulic pressure pump side of the check valve comprising the valve seat member 56a, ball valve 56g and spring 56f), and a single check valve 71 is installed in the discharge line 67 in body 50 for allowing flow to the reservoir 51.

Accordingly, the reservoir 51, hydraulic pressure pump 52 and associated components (i.e., the portion B enclosed by the two-dot chain line in FIG. 1) may be mounted on the vehicle separately of the pressure regulating valve 56, cut-off valve piston portions 58A–58D, solenoid valves 57A–57C and by-pass valves 59A–59D, all of which are assembled in the body 50. The resulting assembly (the portion enclosed by the one-dot chain line in FIG. 1) comprises the pressure regulating valve 56, the cut-off valves 58A–58D, the cut-off valve piston portions 58A–58D, solenoid valves 57A–57C and by-pass valves 59A–59D assembled in the body 50. In the assembly before it is mounted on the vehicle, the fluid chamber 56q of the pressure regulating valve 56 is supplied through the hydraulic pressure line 65 with pressurized fluid from a suitable pressurized fluid supply unit (a hydraulic pressure pump or the like, not shown) and the fluid chamber 56t of the pressure regulating valve 56 is subjected through the hydraulic pressure line 68 to a pressure (e.g, air pressure from an air supply apparatus installed at the factory) equivalent to the master cylinder hydraulic pressure. Moreover, a pressure equivalent to the brake fluid pressure is applied to each brake fluid pressure chamber 58g from the wheel cylinder side through the brake fluid pressure lines 61–64, under which condition the solenoid valves 57A–57C are actuated. When this is done, each hydraulic pressure control piston 58f travels its full stroke. By repeating this operation in a short period of time, a large quantity of working fluid can be made to flow from the pressurized fluid supply unit toward through the hydraulic pressure lines 65, 66, 67. This makes possible the ready and rapid venting of the air in the entire power hydraulic pressure system (the fluid chambers 56q, 56r, 56s, 56t of the pressure regulating valve 56, the lines 66, 67 and the fluid chambers 58a, 59g, etc.) extending from the pressure regulating valve 56 of the assembly to the discharge line 67. The vented state can be maintained in the assembly proper by the check valve (members 56a, 56g, 56f) in the pressure regulating valve 56 and the check valve 71 provided in the discharge line 67 of body 50.

Accordingly, in the apparatus (namely the aforesaid assembly, the reservoir 51 and the hydraulic pressure pump 52) after it is mounted on the vehicle, all of the air in the power hydraulic pressure system of the apparatus can be vented if the hydraulic pressure pump 52 is driven a short time, independently of the signal from the computer 80, in a state where the single air bleed 70 provided in the pressure regulating valve 56 is open, thereby to cause the pressurized fluid to flow into the line 56 (inclusive of the fluid chamber 56q) extending from the hydraulic pressure pump 52 to the check valve in the pressure regulating valve 56, thus venting the air from the line 56. Though the air in the line extending from the check valve 71 in the discharge line 67 to the reservoir 51 cannot be vented by the above-described operation, the air is exhausted into the reservoir 51 automatically when the apparatus is operated. Accordingly, it will suffice if a little more than a corresponding amount of working fluid is injected into the reservoir 51 in advance.

Thus, in the third aspect of the present invention, the air is vented from the power hydraulic pressure system with much improved operability in a case where the reservoir 51 and hydraulic pressure pump 52 and associated components are mounted on the vehicle separately of the aforementioned assembly comprising the pressure regulating valve 56, cut-off valve piston portion 58A–58D, solenoid valves 57A–57C and by-pass valves 59A–59D assembled in the body 50.

Let us now describe a variant of the third aspect of the present invention.

In the above embodiment, the third aspect is practiced by using an apparatus equipped with the accumulator 55 and by-pass valves 59A–59D. However, this aspect can also be practiced by using an apparatus which is not equipped with the accumulator 55 and by-pass valves 59A–59D.

Further, in the above described embodiment, the third aspect is practiced by using an apparatus in which the reservoir 51 and hydraulic pressure pump 52 and associated components are mounted on the body 50. However, this aspect can also be practiced by using an apparatus in which the reservoir 51 and hydraulic pressure pump 52 and associated components are mounted on the vehicle body.

An embodiment of the second aspect of the present invention will now be described with reference to FIGS. 4A through 6B to further clarify the present invention. To facilitate the understanding of this embodiment, portions in FIGS. 4 and 6 that are identical with those in FIGS. 1 through 3 will be indicated by the reference characters of FIGS. 1 through 3 in the following description and these reference characters will be enclosed by parentheses. Reference numeral 1 denotes the brake pedal and numeral 2 designates the brake master cylinder. The apparatus illustrated includes a first valve (5, 8), a second valve (57), a third valve (42, 44) and a fourth valve (7, 11). The brake master cylinder 2 is operatively coupled to the brake pedal 1 and, in response to depression of the brake pedal 1, generates hydraulic pressure corresponding to the pressing force applied to the brake pedal. This hydraulic pressure is applied to a valve chamber 6 (58c) in a valve seat 5 first through the line 61, then a hole 4a in a body 4 and next an annular groove 5a and a bore 5b of a valve seat 5 fitted securely and liquid tightly in a cylinder bore 4b of the body 4. The valve chamber 6 is partitioned by a valve seat 7 fitted liquid tightly into the valve seat 5. When a valve element 8 disposed in the valve chamber 6 opens a hole 5c in the valve seat 5, which is the state illustrated, the hydraulic pressure applied to the valve chamber 6 acts upon a chamber 12 (59f) on the right side of a valve seat 11 first through the hole 5c, then through a pressure reducing chamber 10 (58g) delimited on the left side of the valve seat 5 by a hydraulic pressure control piston 9 (58f) fitted slidably and liquid tightly into the cylinder bore 4b, then through a passageway 5d in the valve seat 5, and lastly through a passageway 11a (58j) in the valve seat 11. The chamber 12 is delimited by a closure member 13 fitted securely and liquid tightly into the cylinder bore 4b, a piston 14 fitted slidably and liquid tightly into the interior of the closure member 13, and the valve seat 11. When a valve element 15 (59d) arranged in a valve chamber 15 (59c) inside the valve seat 11 closes a central bore 7a of a valve seat 7 and opens a hole 11b in the valve seat 11, as illustrated in the drawing, the hydraulic pressure applied to the chamber 12 is impressed upon the wheel brake cylinder 22 through the hole 11b, valve chamber 15, hole 11c in the valve seat 11, annular grooves 4c, 4d in the body 4, and line 61b, in the order mentioned.

Valve elements 8, 16, which constitute the first and fourth valves, are urged away from each other by a spring 19 (59l) interposed between these two valve elements. As shown in the drawing, the hydraulic pressure control piston 9, while occupying its rest position, lifts the valve element 8 from the valve seat 5 against the force of the spring 19 to open the hole 5c. Further, as shown in the drawing, the piston 14, while occupying its rest position, lifts the valve element 16 from the valve seat 11 against the force of the spring 19 to open the hole 11b and contact the valve seat 7, thereby closing the central bore 7a. As will become clear from a description given below, the valve seat 5 and valve element 8 construct the first valve, and the valve seats 7, 11 and valve element 16 construct the fourth valve.

The pump 52 for generating the power hydraulic pressure is driven by the motor 53 to draw in fluid from the reservoir 51 and discharge the fluid into the hydraulic line 65 through a strainer 52a and the check valve 54. The gas spring-type accumulator 55 and pressure-sensitive switch 55d are connected to the line 65. The pressure-sensitive switch 55d and motor 53 are connected to the electronic control unit (computer) 80. The latter responds to a signal from the pressure-sensitive switch 55d by operating the motor 53 in such a manner that hydraulic pressure internally of the accumulator 55 resides within a prescribed range (175-200 kg/cm$^2$) necessary for the operation of the apparatus. Power hydraulic pressure from the accumulator 55 is supplied by the line 65 to the line 66 via the pressure regulating valve 56. The line 66 introduces the power hydraulic pressure to the power hydraulic pressure chamber 58a on the left side of the hydraulic pressure control piston 9.

The pressure regulating valve 56 corresponds to the third valve mentioned above and has a body 35 which includes a hole 35a communicating with a line 65, a hole 35b communicating with the reservoir 51 via the drain line 67, a hole 35c communicating with the line 66, and a hole 35d communicating with the line 61. The body 35 has a cylinder bore 35e in which a secured fitted a valve seat 37, washer 38, piston guide 39 and closure member 40, in the order mentioned starting from the innermost (leftmost) end. A liquid-tight condition is maintained between the wall surface of the cylinder bore 35e and the valve seat 37, piston guide 39 and closure member 40 (56d). The left end face of the valve seat 37 is provided with an annular projection 37a, on which is securely fitted a spring retainer 41 (56e) provided with a multiplicity of pores so that the retainer may also serve as a filter. Arranged in the filter/spring retainer 41 are a ball 42 for opening and closing a hole 37b of the valve seat 37, and a spring 43 (56f) for urging the valve 42 into contact with the valve seat 37 so as to close the hole 37b. The hole 37b of valve seat 37 has a large-diameter portion on its right side. Arranged in this large-diameter portion are a movable member (valve body 56i) 45 having a valve 44 press-fitted securely into its right end portion, and a spring 46 for urging the movable member 45 toward the side of a washer 46. The movable member 45 has a right-end portion the outer diameter of which is smaller than the inner diameter of the washer 38 and is formed to include a shoulder (flanged portion) 45a the outer diameter of which is larger than the inner diameter of the washer 38. The shoulder 45a limits the rightward travel of the movable member 45 by coming into abutting contact with the washer 38.

A piston 47 (56l) is fitted slidably and liquid tightly into the piston guide 39 (56c). Also arranged in the piston guide 39 (56l) are a spring 48 (56j) for urging the piston 47 toward the side of the washer 38, and a rod 49 (spool 56p) whose left-end portion slidably and liquid tightly penetrates the piston 47. The rod 49 is formed to include a passageway 49a opened and closed by the valve element 44, and a passageway 49b communicating with the drain chamber 56s, which communicates the passageway 49a with the hole 35b. The rod 49 is urged by a spring 56n, which is interposed between it and the piston guide 39, in such a manner that the passageway 49a is closed by the valve 44. The left-end portion of the rod 49 is slidably fitted into a blind hole 56u of the piston 56m, which is slidably and liquid tightly fitted into closure member 40. A chamber 56t delimited in the closure member 40 by the piston 56m communicates with the hole 35d through a hole 40a formed in the closure member 40 and an annular passage 50a. Accordingly, the hydraulic pressure generated by the brake master cylinder 2 is applied to the chamber 56t. Owing to the hydraulic pressure in this chamber 56t, the piston 56m is slid toward the side of the rod 49 against the force of a spring 56o interposed between it and the piston guide 39, thereby reducing and then eliminating a gap 56v between the bottom surface of the blind hole 56u and the right-end face of the rod 49 and, further, pushing the rod 49 leftward so that the passageway 49a is closed by the valve 44. In this state the valve 44 and movable member 45 are moved together with the rod 49 against the force of the spring 46, and the valve element 42 is lifted from the valve seat 37 against the force of the spring 43 and the power hydraulic pressure from the accumulator 55, thereby opening the hole 37b to introduce the power hydraulic pressure from the accumulator 55 to the chamber 56r. The power hydraulic pressure in the chamber 56r urges the rod 49 and piston 47 rightward. If, in the course of the rise in power hydraulic pressure in the chamber 56r, the urging force acting upon the rod 49 exceeds the urging force of the piston 56m and spring 56n before the urging force acting upon the piston 47 exceeds the urging force of the spring 48 owing to the fact that the hydraulic pressure applied to the chamber 57t is low, then the valve 43, movable member 45, valve 4, rod 49 and piston 56m will move rightward in unison. In the course of this rightward movement, the valve 42 contacts the valve seat 37 to stop the introduction of power hydraulic pressure from the accumulator 55. Next, the shoulder 45a of the movable element 45 (valve body 56i) abuts against the washer 38 to halt the movement of the movable element 45 and valve 44. With further movement of the rod 49, the valve 44 opens the passageway 49a in the rod 49, so that the power hydraulic pressure in chamber 56r stops rising and begins to fall. If, with this decline in power hydraulic pressure, the rod urging force due to the power hydraulic pressure in chamber 56r again falls below the urging force of piston 56m and spring 56n, the passageway 49a is closed by the valve 44 and the valve 42 is lifted from the valve seat 37. With repetition of this operation, the power hydraulic pressure in chamber 56r is regulated at a first predetermined ratio to a value proportional to the hydraulic pressure in the chamber 56t, namely the hydraulic pressure generated by the brake master cylinder 2 (see the line B-C in FIG. 5). When, during the course of the rise in pressure in the chamber 56r, the hydraulic pressure applied to the chamber 56t is high so that force urging the rod 49 rightward does not exceed the urging forces of the piston 56m and spring 56n even though the force urging the piston 47 rightward exceeds the urging force of the spring 48, the piston 47 slides rightward and abuts against the shoulder 49c of the rod 49 to urge the rod 49 rightward. As a result, the force with which the power hydraulic pressure in chamber 56r urges the rod 49 rightward is the resultant of the forces acting on the rod 49 and the force acting on the piston 47. In dependence upon the relationship of the magnitudes of this resultant force, the forces of the springs 43, 46, 56o and the force of the piston 53, the piston 56m, rod 49, valve 44, movable member 45 and valve 42 move right or left so that the power hydraulic pressure in the chamber 56r is regulated at a second predetermined ratio to a value proportional to the hydraulic pressure produced by the brake master cylinder 2 (see line C-D in FIG. 5). The force of the spring 56n is set to a value which will enable it to move the valve 44, movable member 45 and valve 42 leftward against the power hydraulic pressure from the accumulator 55 and the force of springs 43, 46 and to lift the valve 42 from the valve seat 37. Therefore, when the hydraulic pressure is not being applied to the chamber 56t, opening and closing of passageway 49a by a valve 44 and of hole 37b by valve 42 takes place so that a predetermined minimum power hydraulic pressure (see line A-B in FIG. 5) corresponding to the force of spring 56n is introduced from the accumulator 55 to the chamber 56r.

The power hydraulic pressure in chamber 56r is applied from a groove 38a in washer 38 to the line 66 via the annular groove 35f and hole 35c of body 35.

It will be understood from the foregoing that the valve seat 37 and valve 42 constitute one part of the aforementioned valve section, the valve 44 and the rod 49 constitute the other part of the valve section, and the third valve is constituted by these two valve sections.

The power hydraulic pressure from the pressure regulating valve 56 impressed upon the line 66 passes through a solenoid valve 57a and is applied to the power hydraulic pressure chamber 58a on the left side of the hydraulic pressure regulating piston 9 (58f) from the hole 4e in body 4. The aforementioned second valve is constructed by the solenoid valve 57a and a normally closed solenoid valve 57b installed in a line 66a connecting the drain line 67 with the line 66, which connects the solenoid valve 57a and the power hydraulic pressure chamber 58a. These solenoid valves 57a, 57b are connected to the electronic control unit 80, which ordinarily does not energize the valves 57a, 57b so that power hydraulic pressure from the pressure regulating valve 56 is supplied to the hydraulic pressure chamber 58a. However, when the brake is applied and the electronic control unit 80 finds that the wheel is about to lock on the basis of a signal from the wheel rotation sensor 32, the unit 80 actuates both of the solenoid valves 57a, 57b. As a result, the working fluid in the power hydraulic pressure chamber 58a is caused to flow out to the reservoir 51 to exhaust the power hydraulic pressure from the control piston 9, whereby the piston 9 moves leftward owing to the hydraulic pressure in the pressure reducing chamber 10 (58g). At the beginning of this leftward stroke of piston 9, the valve element 8 contacts the valve seat 5 to close the hole 5c. The subsequent portion of the leftward stroke of piston 9 increases the volume of pressure reducing chamber 10 (which constitutes the hydraulic pressure line section on the wheel brake cylinder side) and reduces the hydraulic pressure in the wheel brake cylinder 22, thereby diminishing the braking force acting upon the wheel. As a result, the rotating speed of the wheel increases to eliminate the danger of wheel locking. When this occurs, the electronic control unit 80 restores the solenoid valves 57a, 57b to their previous state so that the hydraulic pressure from the regulating valve 56 is applied to the power hydraulic pressure chamber 58a to move the control piston 9 back in the opposite direction (i.e., rightward in FIG. 4B), thereby reducing the volume of the chamber 10 to raise the hydraulic pressure in the wheel brake cylinder 22 and, hence, increase the braking force applied to the wheel. The electronic control unit 80 does not actuate the solenoid valves 57a, 57b unless the wheel again approaches lock-up during the increase in the wheel braking force. Therefore, the control piston 9 moves back (rightward) to its rest position to again separate the valve element 8 from the valve seat 5. If the electronic control unit 80 is so designed, the solenoid valves 57a, 57b may be actuated temporarily in dependence upon the manner in which the wheel rotating speed increases in the course of returning the piston 9 to its rest position, thereby halting the rise in hydraulic pressure inside the chamber 10.

In a case where the brake pedal 1 is released during the return stroke of the hydraulic pressure control piston 9, a predetermined minimum power hydraulic pressure from the accumulator 55 is applied to the line 66 by the actuation of the pressure regulating valve 56. Since this minimum hydraulic pressure is applied to the power hydraulic pressure chamber 58a on the left side of the piston 9 via the solenoid valves 57a, 57b constituting the second valve, the piston 9 is restored to its rest postion.

The power hydraulic pressure applied to the line 66 by the pressure regulating valve 56 is applied from line 66 to the chamber 59g via the hole 4f and annular groove 4g in body 4 and the hole 13a in closure member 13. If there is loss of power hydraulic pressure, as by failure of the pump 53 or failure of the accumulator 55 so that a predetermined power hydraulic pressure is not obtained, no power hydraulic pressure is supplied to the chamber 58a on the left side of the hydraulic pressure control piston 9. Therefore, when the brake is applied, the piston 9 is moved leftward by the hydraulic pressure in the pressure reducing chamber 10, so that the valve element 8 contacts the valve seat 5 to close the hole 5c.

However, owing to the fact that the power hydraulic pressure also is no longer applied to the chamber on the right side of the piston 14, the valve element 16 is separated from the valve seat 7 by the spring 19 to open the center bore 7a and contacts the valve seat 11 to close the hole 11b. Accordingly, the hydraulic pressure fed to the valve chamber 6 from the brake master cylinder 2 is applied to the valve chamber 15 through the bore 7a, and from the chamber 6 to the wheel brake cylinder 22, as a result of which braking occurs. At such time, the pressure reducing chambers 10, 16 are cut off from the valve chambers 6, 15 by the action of the valve elements 8, 16, so that the chambers 10, 12 do not wastefully consume fluid from the brake master cylinder 2.

Figure 4A:
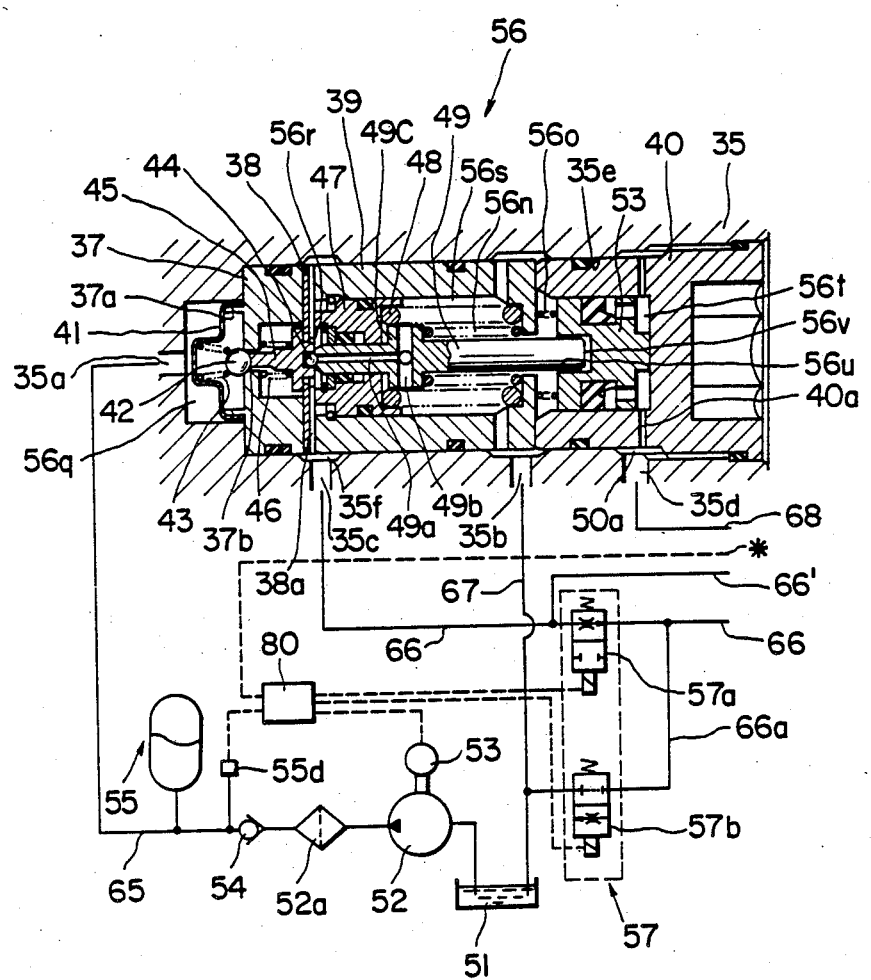
FIGS. 4A, 4B are an overall systematic view according to another embodiment of the present invention.
Figure 4B:
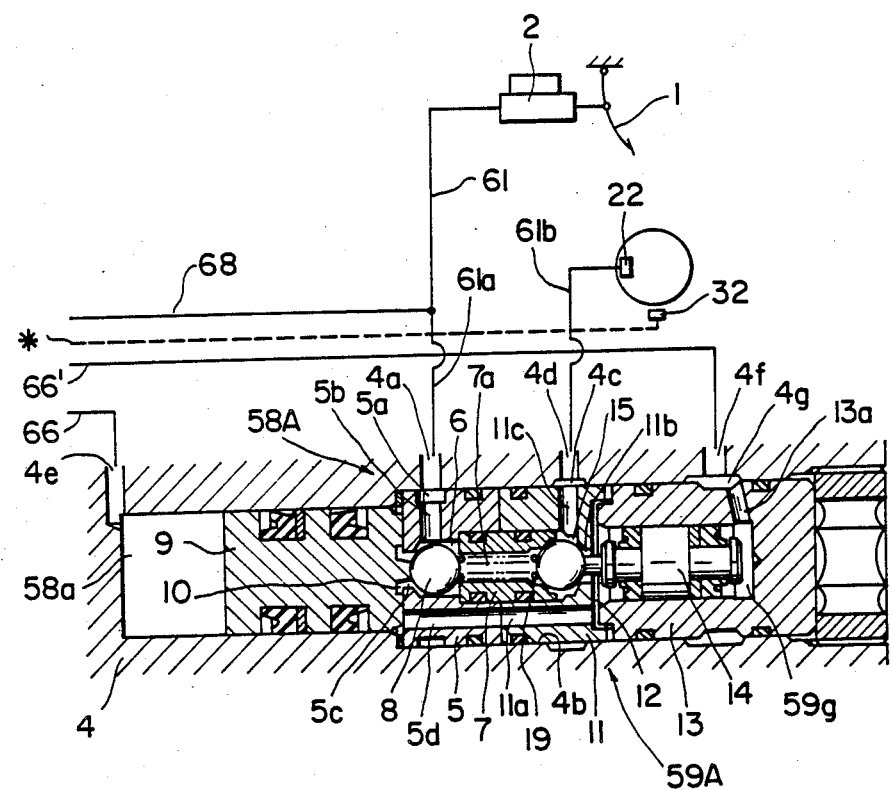
Figure 5:
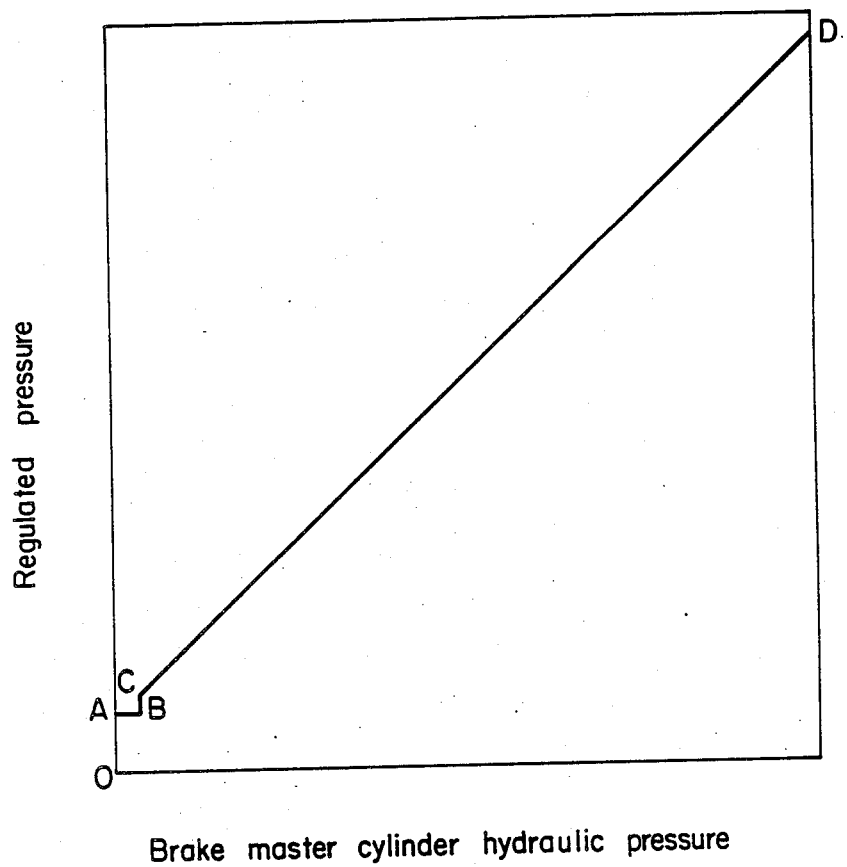
FIG. 5 shows a characteristic curve of a pressure regulating valve in the embodiment of FIG. 4.
Figure 6A:
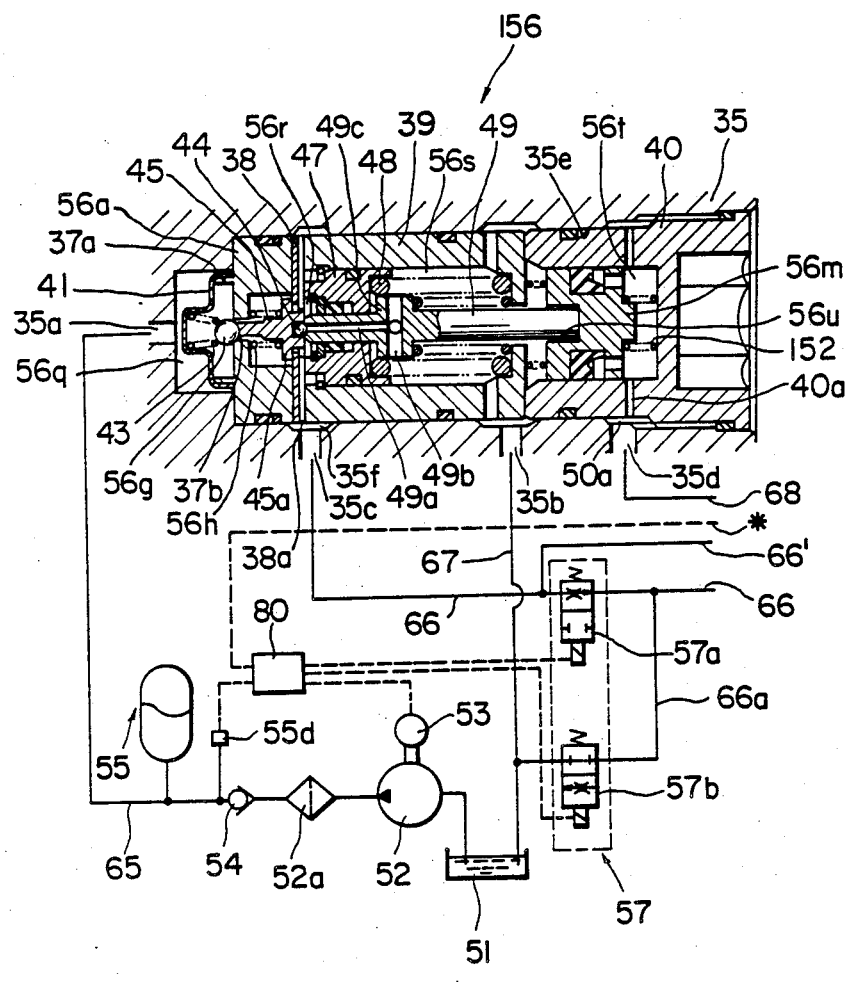
FIGS. 6A, 6B are a systematic view illustrating a variant of the arrangement shown in FIG. 4.
Figure 6B:
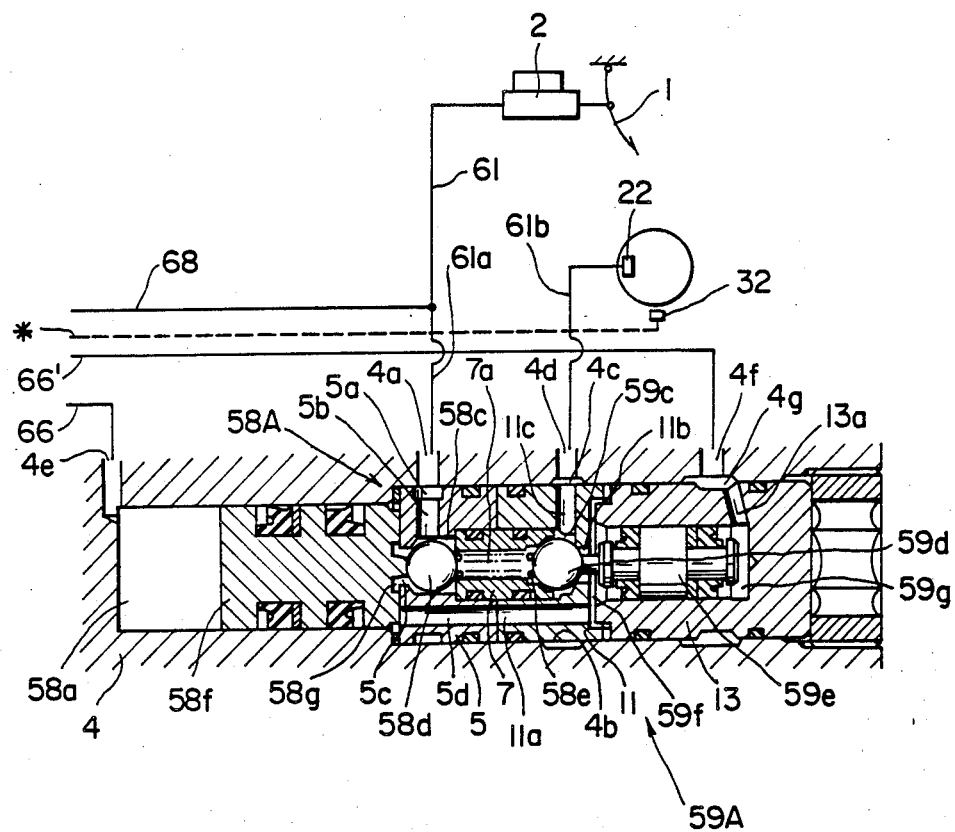

FIGS. 6A, 6B illustrate another embodiment of the above aspect of the present invention. In this embodiment, a portion of the pressure regulating valve shown in FIG. 4A is modified. Specifically, instead of the springs 56Q, 56R shown in FIG. 4A, the present pressure regulating valve, designated at numeral 156, is provided with a spring 152 for biasing the piston 56m toward the rod 49. A characteristic of the kind shown in FIG. 5 is also obtained with the regulating valve 156.

Note that the spring 56Q depicted in FIG. 4 can be deleted by installing the spring 56n between the rod 49 and the piston 56m.

As to the advantages of the second aspect of the invention as described in detail above, there is much less load upon the seal members used to construct the hydraulic pressure line for applying the power hydraulic pressure to the hydraulic pressure control piston from the accumulator. As a result, seal member lifetime is extended and maintenance facilitated. At the end of apparatus operation, the hydraulic pressure control piston is reliably restored to its rest position. This prevents a delay in operation when the brake is applied, scoring of the seal cup at the master cylinder and the forcing back of the brake pedal. Aonther advantage is that there is less consumption of the working fluid in the accumulator, fewer operating cycles of the pump and, hence, less consumption of power.

As many apparently widely different embodiments of the present ivnention can be made without departing from the spirit and scope thereof, it is to be understood that the invention is not limited to the specific embodiments thereof except as defined in the appended claims.

What is claimed is:

1. An antiskid apparatus for an automotive vehicle having a brake master cylinder and at last one wheel brake cylinder, comprising:
   a cut-off valve for selectively cutting a brake line connecting the vehicle brake master cylinder with the wheel brake cylinder into a brake line on the brake master cylinder side and a brake line on the wheel brake cylinder side;
   an accumulator for accumulating power hydraulic pressure above a maximum value of brake fluid pressure at which a wheel corresponding to the wheel brake cylinder approaches a state near lock-up;
   a hydraulic pressure control piston movable in a first direction by hydraulic pressure in the brake line on the wheel brake cylinder side and movable in an opposite second direction by the power hydraulic pressure from said accumulator to close and open said cut-off valve, respectively, and, moreover, to increase and restore the volume of the brake line on the wheel brake cylinder side, respectively, by such movement in the first and second directions; and
   a directional control valve installed in a power hydraulic pressure line connecting said accumulator with a fluid chamber formed on one side of said hydraulic pressure control piston for being supplied with the power hydraulic pressure, said directional control valve operating to discharge the power hydraulic pressure from the fluid chamber when the wheel approaches the lock-up state and to supply the fluid chamber with the power hydraulic pressure under all other conditions; characterized by:
   a pressure regulating valve installed in the power hydraulic pressure line connecting said accumulator with said directional control valve;
   wherein when the brake master cylinder is actuated for braking, said pressure regulating valve is operable, in dependence upon master cylinder hydraulic pressure delivered by the brake master cylinder, to reduce the power hydraulic pressure supplied by said accumulator to a hydraulic pressure higher, by a predetermined amount, than the master cylinder hydraulic pressure, and to deliver this reduced hydraulic pressure to said directional control valve; and when the brake master cylinder is not actuated, said pressure regulating valve cuts off communication between said accumulator and said directional control valve and brings the hydraulic pressure in the hydraulic pressure line leading to the fluid chamber through said directional control valve to a value not higher than a set value.

2. An antiskid apparatus for an automotive vehicle having a brake master cylinder and a wheel brake cylinder, comprising:
   a first valve installed in a brake line connecting the brake master cylinder and the wheel brake cylinder for selectively cutting the brake line into a brake line on the brake master cylinder side and a brake line on the wheel brake cylinder side;
   an accumulator for accumulating power hydraulic pressure generated by a power-driven pump;
   a hydraulic pressure control piston movable in a first direction from a rest position by hydraulic pressure in the brake line on the wheel brake cylinder side and movable in an opposite second direction for restoration to the rest position by the power hydraulic pressure to close and open said first valve, respectively, and, moreover, to increase and restore the volume of the brake line on the wheel brake cylinder side, respectively, by such movement in the first and second directions; and
   a second valve operable when a wheel corresponding to the wheel brake cylinder is rotating normally for applying the power hydraulic pressure to said hydraulic pressure control piston in order to situate said hydraulic pressure control piston at the rest position by moving hydraulic pressure control piston against the hydraulic pressure in the brake line on the wheel brake cylinder side, and operable when said wheel is about to lock for discharging the power hydraulic pressure from said hydraulic pressure contol piston in order to move said hydraulic pressure control piston in the first direction by the hydraulic pressure in the brake line on the wheel brake cylinder side; characterized by:
   a third valve which includes:
   a first valve portion for controlling communication and cut-off of communication between said accumulator and a power hydraulic pressure chamber supplying said hydraulic pressure control piston with power hydraulic pressure;
   a second valve portion for controlling communication and cut-off of communication between the power hydraulic pressure chamber and a drain line;
   a piston actuated by hydraulic pressure produced by the brake master cylinder for opening and closing said first and second valve portions in such a manner that power hydraulic pressure proportional to the hydraulic pressure produced by the brake master cylinder is delivered to the power hydraulic pressure chamber from said accumulator; and
   spring means for opening and closing said first and second valve portions in such a manner that a predetermined minimum power hydraulic pressure is delivered to the power hydraulic pressure chamber from said accumulator when said piston is in the non-actuated state.

3. An antiskid apparatus for an automotive vehicle having a vehicle body, a brake master cylinder and a plurality of wheel brake cylinders for corresponding wheels, comprising:
   a plurality of cut-off valves, which are assembled into a body to be mounted on the vehicle body, for cutting each of a plurality of brake lines, which connect the master cylinder and respective ones of the wheel brake cylinders, into a section on the master side and a section on the wheel side;

a hydraulic pressure pump, which is assembled in the body or mounted on the vehicle body, for feeding, under pressure, a working fluid contained in a reservoir;

a pressure regulating valve assembled in the body and which, in dependence upon master cylinder hydraulic pressure, controls the pressurized working fluid fed from said hydraulic pressure pump to obtain a power hydraulic pressure higher than the master cylinder hydraulic pressure and to feed this power hydraulic pressure to a supply line, the pressure regulating valve communicating the supply line with the reservoir through a discharge line when the master cylinder hydraulic pressure is approximately zero and having an internal check valve for cutting off flow from said hydraulic pressure pump to the supply line;

a plurality of hydraulic pressure control pistons which are assembled in the body and which each form on one side thereof a power hydraulic pressure chamber receiving the power hydraulic pressure and on the other side thereof a brake fluid pressure chamber communicating with respective ones of the brake lines for being moved in a first direction by hydraulic pressure on the wheel-side section of the respective brake lines and moved in an opposite second direction by the power hydraulic pressure to close and open, respectively, the respective cut-off valves and increase and restore the volume, respectively, on the wheel-side section by such movement in the first and second direction; and a plurality of directional control valves assembled in the body and installed in the supply line connecting the power hydraulic pressure chambers with said pressure regulating valve and in the discharge line connecting the hydraulic pressure chambers with the reservoir for communicating the respective power hydraulic pressure chambers with the reservoir when the respective wheels, which are controlled by the respective brake fluid pressures applied through the respective brake lines, attain a state near lock-up, and for communicating the respective power hydraulic pressure chambers with said pressure regulating valve under all other conditions;

said pressure regulating valve having an air bleed provided on a portion of the check valve on the side of said hydraulic pressure pump; and the discharge line in the body being provided with a second check valve which allows flow to the reservoir.

4. The apparatus as defined in claim 2, wherein the second valve portion includes a spool disposed between the first valve portion and the piston actuated by the brake master cylinder, the spool being urged by said spring means to close the second valve portion and to open the first valve portion.

5. The apparatus as defined in claim 4, wherein the spool has a valve hole for communicating a chamber communicatable with the drain line, the hole being opened and closed in accordance with movement of the spool.

6. The apparatus as defined in claim 5, wherein the spool is disposed so as to be urged by the piston actuatable by the brake master cylinder in a direction to open the first valve portion and to close the second valve portion.

7. The apparatus as defined in claim 6, wherein the spool is urged in said direction by the spring means.

8. The apparatus as defined in claim 7, wherein the spring means includes a first spring urging the spool in the same direction as the piston actuatable by the brake master cylinder.

9. The apparatus as defined in claim 8, wherein the spring means includes a second spring counteracting the first spring.

10. The apparatus as defined in claim 6, wherein the first valve portion includes a valve element and a valve seat with a hole for communicating the power hydraulic pressure of the accumulator with said power hydraulic pressure chamber for said hydraulic pressure control piston of the first valve, the valve element being normally urged to close the hole.

11. The apparatus as defined in claim 10, wherein the first and second valve portions further include a valve body disposed therebetween to support a second valve element and to abut to the first valve element when the spool is urged to open the first valve portion.

12. The apparatus as defined in claim 11, wherein the first valve portion further includes a spring to urge the first valve element to close, and the valve body is urged to close the first valve portion by a further spring.

13. The apparatus as defined in claim 11, wherein the valve body includes a flanged portion to abut to a shoulder of the casing wall provided between the first and second valve portions thereby to close the communication between the first and second valve portions.

14. The apparatus as defined in cliam 6, wherein there is a further piston with a center bore to axially guide the spool therein and define a fluid chamber communicatable with the power hydraulic pressure chamber through the second valve, the further piston being disposed so as to urge the spool against the spring means by the hydraulic pressure produced in the fluid chamber.

15. The apparatus as defined in claim 14, wherein said further piston is backed by a spring against the hydraulic pressure in said fluid chamber acting thereon.

16. The apparatus as defined in claim 15, wherein the spool has a protrusion to abut to said further piston when the further piston is retracted against the spring.

17. The apparatus as defined in claim 6, wherein the rod is guided by the piston actuatable by the brake master cylinder and when this piston is actuated the spool is urged to move along with this piston.

18. The apparatus as defined in claim 17, wherein the spool is disposed by an axial clearance with the piston, actuatable by the brake master cylinder, at the rest position thereof.

19. The apparatus as defined in claim 7, wherein said spring means comprises a spring to urge the piston actuatable by the brake master cylinder in the direction to open the first valve portion.

20. The apparatus as defined in claim 7, wherein said spring means comprises a spring disposed between the spool and the piston actuatable by the brake master cylinder.

21. The apparatus as defined in claim 7, wherein said spring means comprises a spring disposed between the spool and the casing, and a further spring is disposed to urge the piston actuatable by the brake master cylinder towards the rest state.

22. The apparatus as defined in claim 15, wherein the spring is so adjusted to allow a slight movement of the first valve portion in the first direction, while the piston is designed to urge the spool in the reverse direction against the biasing force of the springs by the force applied thereto in the chamber defined by the piston and the second valve portion therebetween.

23. The apparatus as defined in claim 2, wherein the first and second valve portions, and the piston actuatable by the brake master cylinder are disposed in an axial alignment.

24. The apparatus as defined in claim 2, wherein the second valve includes a directional control valve controlled by an electronic control unit which receives a signal responsive to the rotation state of the wheel and delivers a signal to stop the application of the power hydraulic pressure to said hydraulic pressure control piston and discharge the power hydraulic pressure.

25. The apparatus as defined in claim 24, wherein the second valve includes a pair of solenoid valves; a first solenoid valve being normally open when the brake is not locked and closed when the brake is about to lock, the first solenoid valve being interposed in the line delivering the hydraulic power pressure to the hydraulic pressure control piston; and the second solenoid valve being disposed so as to discharge the hydraulic power pressure from the hydraulic pressure control piston, the second solenoid valve being normally closed when the brake is not locked and opened when the brake is about to lock.

* * * * *